United States Patent [19]

Jane et al.

[11] Patent Number: 5,057,157

[45] Date of Patent: Oct. 15, 1991

[54] PREPARATION OF GRANULAR COLD WATER SWELLING/SOLUBLE STARCHES BY ALCOHOLIC-ALKALI TREATMENTS

[75] Inventors: Jay-lin Jane, Ames, Iowa; Paul A. Seib, Manhattan, Kans.

[73] Assignee: Kansas State University Research Foundation, Manhattan, Kans.

[21] Appl. No.: 600,910

[22] Filed: Oct. 22, 1990

[51] Int. Cl.$^5$ .................. C08B 30/14; C08B 30/12
[52] U.S. Cl. .................................. 127/70; 127/71; 127/33
[58] Field of Search ................ 127/70, 71, 33

[56] References Cited

U.S. PATENT DOCUMENTS 3,130,081  4/1964  Evans ........................... 127/70
3,563,798  2/1971  Germino et al. ............... 127/70

Primary Examiner—Theodore Morris
Assistant Examiner—P. L. Hailey
Attorney, Agent, or Firm—Hovey, Williams, Timmons & Collins

[57] ABSTRACT

A process for the preparation of granular cold water swelling/soluble starches by alcoholic-alkali treatments is disclosed which comprises contacting a quantity of starch granules with respective quantities of an alcohol and a strong base to swell the granules and convert the starch to form having increased cold water solubility. The process can be used on waxy, high amylose, tuber, and normal starches. The resulting cold water swelling/soluble starch preferably exhibits about 50% to 94% solubility in cold water.

12 Claims, No Drawings

PREPARATION OF GRANULAR COLD WATER SWELLING/SOLUBLE STARCHES BY ALCOHOLIC-ALKALI TREATMENTS

BACKGROUND OF THE INVENTION

1. Field of the Invention

The present invention is broadly concerned with an improved process for the preparation of granular cold water swelling/soluble starches which provide instant thickening without lumpiness when hydrated in cold water. More particularly, it is concerned with a process wherein granules of starch are treated with alcohol and a strong base to cause swelling of the granules and conversion to a form having increased cold water solubility. The starch material thus prepared has an ability to set to a sliceable gel without cooking or chilling. Pastes prepared from granular cold water swelling/soluble starches at room temperature give a smooth texture with no lumps.

2. Description of the Prior Art

Starches which provide instant thickening are used to shorten or eliminate cooking time in convenience foods, such as soups, puddings and breading batters. In the conventional processes for making instant starches, a starch slurry is simultaneously cooked and dried on a drum dryer to give a thin sheet, which is subsequently ground to a fine powder. Such drum-cooked instant starches often give inferior performance in foods as compared with cook-up starches. This is believed to result from the fact that on the hot drum, the cooked granules fuse together and are strongly cemented to form a starch sheet. Fine grinding of the sheet gives irregularly shaped particles that contain retrograded starch, leading to a grainy appearance upon rehydration. In addition, drum-cooked instant starches have reduced consistency upon rehydration to a paste and form gels of reduced strength. Recently developed methods yield pre-gelatinized starches with granular integrity but are not universally successful for waxy, high-amylose, and normal starches. Some granular cold water-soluble starches hydrate in cold to warm solutions of sugar without lumping, and their pastes are on a par with cook-up starches. Others hydrate in cold water without lumping, but have reduced capacity to generate thickening power.

In addition, prior methods of producing instant starches are not generally applicable to all types of starches such as waxy, high amylose and normal starches. Accordingly, it has been necessary to vary the processing techniques for the various types of starches, in order to successfully produce instant starches.

U.S. Pat. No. 4,465,702 describes a process of thermal treatment of native corn starch in aqueous alcohol solutions. The starch thus treated remains in granular shape, but becomes cold water soluble.

U.S. Pat. No. 4,634,596 describes a thermal treatment of mixtures of waxy and normal starches in aqueous alcohol solutions; 20% to 70% of waxy starch was blended in the starch mixture. The mixed starches became cold water soluble, but retained the granular shape.

U.S. Pat. No. 3,399,081 describes the preparation of nonbirefringent granular starches which give pastes when mixed with cold water. The starch is prepared by treating native starch with a mixture of ammonia and methanol at low temperatures. The product has a swelling power of 17, soluble value of 36%, and a fat content of 0.4% at 25° C.

U.S. Pat. No. 847,658 describes a process of preparing starch capable of swelling in cold water by first mixing the starch with a liquid hydrocarbon such as paraffin oil and then adding caustic alkali.

U.S. Pat. No. 4,229,489 describes a process of preparing cold water dispersible tapioca starch by cross-linking followed by acid thinning and drum-drying.

U.S. Pat. No. 4,260,642 describes a process of preparing instant starches for pudding mixes. A native or modified starch slurry is gelatinized in the presence of sodium or calcium stearyl-2-lactylate and then drum dried and ground.

U.S. Pat. No. 4,280,851 describes the use of multiple-port nozzles in a spray dryer to gelatinize and recover essentially intact granular cooked starch.

SUMMARY OF THE INVENTION

The problems outlined above are in large measure solved by method of granular cold water swelling/soluble starches in accordance with the present invention. That is to say, this method can be applied to all starches independent of their amylose content and gives highly desirable cold water swelling/soluble starches.

The present invention is concerned with conversion of ungelatinized starch to granular cold water swelling/soluble starch by treatment with an alcohol and a strong base to effect swelling of the starch granules and conversion to a form having increased cold water solubility. The converted starch granules are recovered, and may be dehydrated, dried, and stored for further use. In particularly preferred forms, the treated starches are washed with an aqueous alcohol solution, neutralized with an acid-alcohol solution, and washed with an aqueous alcohol solution to remove any salts generated during neutralization.

The process of the invention may be carried out on a variety of starches, such as waxy starches, high amylose starches, tuber starches and normal starches. Specific examples include waxy starches containing about 1% to about 8% amylose, such as waxy corn, waxy barley, and waxy rice; high amylose starches containing about 55% or more amylose, such as those from corn and barley; and normal starches containing about 20% to about 30% amylose, such as normal corn, wheat, tapioca, and potato starch.

Preferably, the alcohol/alkali treatment of the starch is effected by first dispensing the starch in an appropriate alcohol and water, followed by addition of a strong base; alternately, the alcohol and base can be premixed in water and then contacted with the starch. Preferably, a monohydric alcohol having one to four carbon atoms is used as the treating alcohol. In particularly preferred embodiments, a monohydric alcohol having two or three carbon atoms, such as ethanol, 1-propanol, or 2-propanol is used, although methanol and butanol are also possibilities. The preferred base component is one which is at least 80% ionized in water at room temperature, for example, an alkali metal hydroxide, or an alkaline earth hydroxide. Sodium hydroxide and potassium hydroxide are particularly preferred.

One part of starch by weight is advantageously contacted with from about 1 to 10 parts by weight of alcohol, preferably ethanol, from about 0.2 to 0.8 parts by weight of strong base, preferably sodium or potassium hydroxide, and 2 to 7 parts by weight of water, while stirring. The process is carried out at 20° C. to 40° C., preferably at room temperature (e.g., about 25° C.). After a contacting period of about 10 to 60 minutes, preferably from about 20 to 40 minutes, the starch is allowed to sediment, and the supernatant is decanted. Those skilled in the art will appreciate that other methods, such as filtration and centrifugation may be used to separate the treated starch from the liquid phase.

After the alcohol/alkali conversion process is complete, the starch is normally recovered. Preferably, an aqueous alcohol solution comprising from about 60% to 75% by volume ethanol or methanol is first used to wash the converted starch, and the starch is separated from the supernatant. An aqueous alcohol solution, preferably having about 3 parts by volume or high alcohol concentration, is used to resuspend the starch while stirring. The dispersion is the neutralized by controlled addition of an acid-alcohol solution having about 1 to 3 molar concentration of acetic or hydrochloric acid in ethanol or methanol. The starch is sedimented and collected from the neutralized liquids.

The neutralized starch is then preferably washed with an aqueous solution of 60% to 75% by volume of methanol or ethanol under stirring for about one hour. The washing process may be repeated one to three times until all salts generated during the neutralization are removed. The starch is then dehydrated with methanol or absolute ethanol under stirring, sedimented, and the liquid drained. The starch is dried, preferably in a forced-air oven at about 80° C. for about 3 hours. The preferred granular cold water swelling/soluble starches produced by the method of the present invention are at least 50% cold water soluble, but if desired lesser degrees of solubility can be obtained, e.g., above about 25%. The starches of the product do not give an agglomerated texture while mixing with water to form a paste.

DESCRIPTION OF THE PREFERRED EMBODIMENT

Waxy corn starch, a starch containing essentially no amylose, is treated with a solution containing about 4.7 to about 8.7 parts of ethanol, about 0.24 to about 0.37 parts NaOH, and about 2.1 to about 3.2 parts water. The resulting cold water soluble/swelling starch gives about 50% to 94% solubility in cold water. Example I describes the most preferred treatment method.

EXAMPLE I

Native waxy corn starch (1 part by weight, dsb) was suspended in absolute ethanol (6.9 parts by weight). Aqueous NaOH solution (2.73M, 3.4 parts by weight) was added slowly under mechanical stirring. After the addition of NaOH was complete, the reaction mixture was stirred for 10 additional minutes, and drained. The starch was then washed with an aqueous ethanol solution I (75% alcohol by volume, prepared by mixing 3 volumes of absolute ethanol and one volume of water), drained, and resuspended in an aqueous ethanol solution II (80% alcohol by volume) and neutralized with HCl (2M in absolute ethanol). The starch was subsequently washed twice with the aqueous ethanol solution I, dehydrated with absolute ethanol, and dried in a forced-air oven at 80° C. The starch retained a granular structure as observed by microscopic examination.

Cold water solubility was determined as follows:

Exactly 100 ml of distilled water at ambient temperature was measured into a Waring blender cup. The blender was operated at slow speed and about 1 gram of starch sample was added over a 15 second period, then stirred for 2 minutes at high speed. A 250 ml centrifuge bottle was filled with the starch solution/suspension and centrifuged at 3100 rpm for 15 minutes. A 25 ml aliquot of the supernatant was transferred to a tared weighing vessel and dried in an oven at 100° C. for 3 to 4 hours. The cold water solubility, expressed as percent water solubles (dsb), was calculated to be 93.4% using the following equation:

$$\% \text{ water soluble } (dsb) = \frac{(\text{wt. of solids in 25 ml}) \times 4}{\text{wt. of sample } (dsb)} \times 100$$

Viscosity of a starch paste made using the converted starch was determined by a Brabender Viscograph. A 6% starch paste was prepared by mixing 27 g starch (dsb) with 423 g water at 25° C. in a Waring blender at low speed for 15 seconds and at high speed for 45 seconds. The paste (400 g) was transferred immediately into the Amylograph cup. Viscosity measurement of the paste was carried out at 75 rpm at 30° C. Viscosity of the starch paste was determined to be 210 Brabender Units (B.U.), compared with 280 B.U. for a paste of native waxy corn starch at the same concentration and temperature prepared by a regular cooking cycle of the amylograph.

When cold water was mixed with the dried converted starch, the paste had a smooth texture with no lumps.

Other usable starch conversion reaction conditions and solubility results are shown in Table I.

TABLE I

| Waxy corn starch parts (wt, dsb) | Abs. ethanol parts (wt) | (NaOH, M) parts by wt. | Water solubility at 25° C., % |
|---|---|---|---|
| 1 | 4.7 | (3.0M) 2.27 | 44.2 |
| 1 | 5.9 | (2.5M) 2.90 | 44.6 |
| 1 | 6.9 | (3.0M) 3.08 | 83.5 |
| 1 | 4.7 | (3.0M) 2.55 | 85.2 |
| 1 | 8.68 | (3.0M) 3.48 | 89.7 |

The high amylose corn starch used here contains about 50–55% amylose. Generally speaking, such starches may be converted into granular cold water swelling/soluble high amylose starch by treating the starch with about 1.3 to about 2 parts ethanol, about 0.5 parts of NaOH, and about 5.8 to about 6.4 parts water. The cold water soluble/swelling starch gives about 50% to 82% solubility in cold water. Example II describes the most preferred treatment method.

EXAMPLE II

High amylose corn starch (1 part by weight, dsb) was suspended in an aqueous alcohol solution containing absolute ethanol (1.5 parts by weight) and water (1.9 parts by weight). Aqueous NaOH solution (3M, 5 parts by weight) was slowly added into the starch suspension while stirring. After the addition of NaOH solution was complete the mixture was stirred for an additional 10 minutes and drained. The starch was then washed with an aqueous ethanol solution III (66% alcohol by volume), drained, and resuspended in an ethanol solution of the same concentration. The starch suspension was then neutralized with HCl (3M in absolute ethanol), and drained. The neutralized starch was washed twice with the aqueous ethanol solution III, dehydrated with absolute ethanol, and dried in a forced air oven at 80° C. oven for 3 hours. The cold water solubility of the starch was determined to be 82% using the method described in Example I. No lumps were observed in a paste of the starch. Other usable conversion reaction conditions and test results are shown in Table II.

TABLE II

| High-amylose corn starch parts (wt, dsb) | Water parts (wt) | Abs. ethanol parts (wt) | NaOH (3M), parts (wt) | Water solubility % at 25° C. |
| --- | --- | --- | --- | --- |
| 1 | 0.75 | 4.26 | 4.3 | 24.9 |
| 1 | 1.20 | 2.60 | 5.0 | 27.4 |
| 1 | 1.4 | 1.97 | 5.0 | 44.6 |
| 1 | 1.7 | 1.3 | 5.0 | 81.2 |

Normal starches, such as corn, wheat, tuber and root starches, such as tapioca and potato, contain about 20–30% amylose. Normal corn starch can be most easily converted to granular cold water swelling/soluble normal starch by treatment with about 4.3 to about 5.2 parts of ethanol, about 0.33 to about 0.4 parts of NaOH, and about 2.9 to about 3.4 parts water. The granular cold water swelling/soluble normal corn starch gives more than 50% solubility in cold water. Example III describes the most preferred treatment method.

EXAMPLE III

Normal corn starch (1 part by weight, dsb) was suspended in an aqueous alcohol solution containing absolute ethanol (1.28 parts by weight) and water (1.73 parts by weight) under mechanical stir. Aqueous NaOH solution (2.5M, 2.75 parts by weight) was added gradually into the starch suspension while stirring. The mixture was stirred for 10 additional minutes after the addition of NaOH solution was complete, and the supernatant was drained. The starch was washed with aqueous ethanol solution III, drained, and resuspended in a fresh quantity of the same ethanol solution. The starch suspension was then neutralized with HCl (3M in absolute ethanol), washed twice with the ethanol solution III (described in Example II), dehydrated with absolute alcohol and dried in a forced-air oven at 80° C. The treated starch retained intact granules and gave about 74% solubility in cold water. No lumps were observed in its paste prepared at room temperature. Other usable conversion reaction conditions and results are given in Table III.

TABLE III

| Normal corn starch parts (wt. dsb) | Abs. ethanol parts (wt) | (NaOH, M) parts (wt) | Water solubility at 25° C., % |
| --- | --- | --- | --- |
| 1 | 5.2 | (3M) 2.89 | 10.4 |
| 1 | 5.4 | (3M) 3.32 | 32.8 |
| 1 | 5.2 | (3M) 3.28 | 53.9 |
| 1 | 4.34 | (3.5M) 3.16 | 69.2 |

We claim:

1. A process for preparing granular cold water soluble starch comprising the steps of:
   providing a quantity of starch granules;
   contacting said granules with respective quantities of an alcohol and a strong base under conditions for causing swelling of said granules and conversion thereof to a form having increased cold water solubility, while retaining the granular character of the starch granules; and
   recovering said converted starch granules having increased cold water solubility.

2. The process of claim 1, wherein said granules are contacted with said alcohol and said base for a period of time of about 10 to about 60 minutes.

3. The process of claim 1, wherein said granules are contacted with said alcohol and said base at a temperature of between about 20° C. and 30° C.

4. The process of claim 1, said starch being selected from the group consisting of tuber starches, waxy starches, high amylose starches, and normal starches.

5. The process of claim 4, said starch being selected from the group consisting of waxy corn, normal corn, wheat, potato, tapioca, and high amylose corn starch.

6. The process of claim 1, said alcohol being selected from the group consisting of monohydric alcohols having 1 to 4 carbon atoms.

7. The process of claim 6, wherein said alcohol is selected from the group consisting of ethanol, 1-propanol, or 2-propanol.

8. The process of claim 1, said base being one which is at least 80% ionized in water at room temperature.

9. The process of claim 1, said base being selected from the group consisting of alkali metal hydroxides and alkaline earth hydroxides.

10. The process of claim 9, said base being selected from the group consisting of sodium hydroxide and potassium hydroxide.

11. The process of claim 1, wherein said converted starch granules are neutralized with an acid-alcohol solution, washed with an aqueous alcohol solution, and then recovered.

12. The process of claim 11, said acid-alcohol solution having an acid member selected from the group consisting of acetic acid and hydrochloric acid and having an alcohol member selected from the group consisting of ethyl and methyl alcohol.

* * * * *